Dec. 23, 1930　　A. K. NOWAK ET AL　　1,786,167
BRIQUETTING MACHINE
Filed Sept. 2, 1927　　2 Sheets-Sheet 1
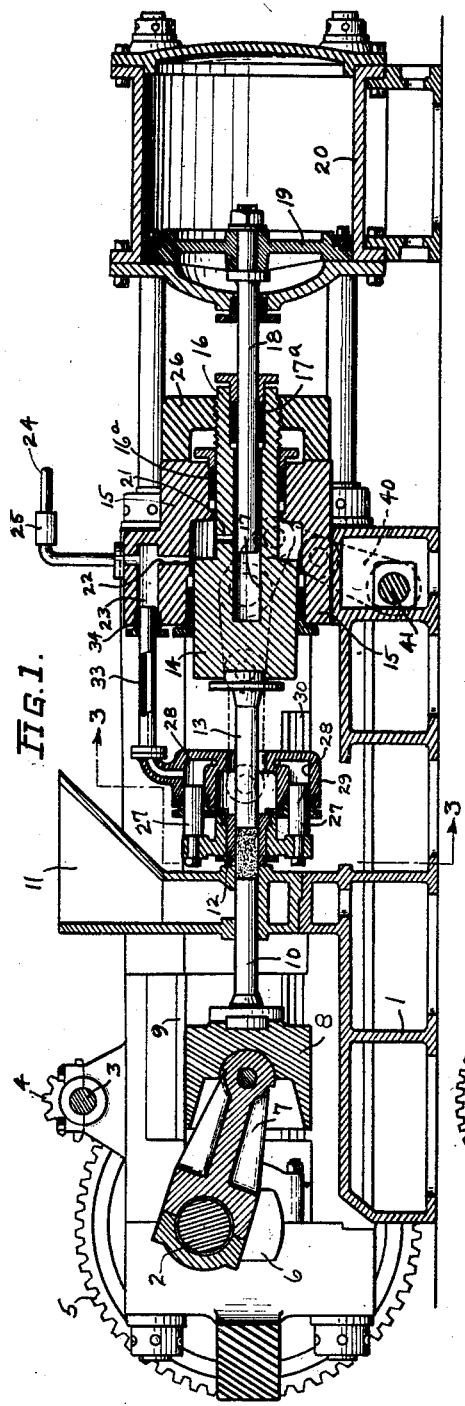

Dec. 23, 1930 A. K. NOWAK ET AL 1,786,167
BRIQUETTING MACHINE
Filed Sept. 2, 1927 2 Sheets-Sheet 2

Patented Dec. 23, 1930

1,786,167

UNITED STATES PATENT OFFICE

ALOIS K. NOWAK, OF CHICAGO, ILLINOIS, AND RICHARD W. DINZL, OF PHILADELPHIA, PENNSYLVANIA, ASSIGNORS TO ALOIS K. NOWAK, OF CHICAGO, ILLINOIS, AND FRANK H. SMITH, OF AKRON, OHIO

BRIQUETTING MACHINE

Application filed September 2, 1927. Serial No. 217,070.

This invention relates to briquetting presses of the type disclosed in our prior Patent No. 1,473,389, granted November 6, 1923, in which the press is mechanically actuated and the pressure exerted upon the material is limited by hydraulic cushioning means which acts to maintain a predetermined pressure on the material to compress the same, as in a hydraulic press, the cushioning means protecting the mechanical actuating means against excessive stresses and enabling the press to be used for briquetting non-uniform material such as scrap metal, iron and steel turnings, granular iron, and the like.

The present invention has for an object to simplify the mechanical actuating and the cushioning devices so as to provide a simple and rugged machine which can be manufactured at a comparatively low cost.

A further object is to provide a press in which the pressure applying plunger is directly connected to the mechanical actuating means and has an invariable stroke while the mold parts are so cushioned as to limit the stresses to which the actuating mechanism is subjected and to cause the application of a predetermined pressure for the necessary period of time to the material being compressed to form the briquettes.

A further object is to provide a briquetting press having opposed pistons operating in a tubular mold casing and in which the relative movements of the pistons and mold casing are such as to form a briquette of substantially uniform density.

A further object is to provide a press in which the main plunger and the mold stripping means are actuated from a single crank shaft and in which the pressure stroke of the plunger and stripping movement of the mold are imparted through mechanical connections from the shaft.

A further object is to provide actuating connections from the crank shaft to the mold casing including a connecting rod and toggle and in which the toggle is so disposed as to transmit to the fixed framework the major portion of the thrust caused by the main plunger during its compression stroke, the connecting rod being so connected to the toggle that the rod is in tension during the portion of the stroke in which the mold casing is positively actuated, so that all of the parts of the actuating connection may be of comparatively light construction.

A further object is to provide the mold casing and thrust receiving plunger with differential cushioning means automatically permitting relative movements of the plunger and casing to obtain uniform compression of material in the mold.

A further object is to provide communicating cushioning cylinders, preferably hydraulic, for the mold casing and thrust receiving plunger, together with a single pneumatic pressure controlling cylinder, for maintaining the differential pressures required.

With the above and other objects in view the invention may be said to comprise the device as illustrated in the accompanying drawings hereinafter described and particularly set forth in the appended claims together with such variations and modifications thereof as will be apparent to one skilled in the art to which the invention relates.

Reference should be had to the accompanying drawings forming a part of this specification in which:

Figure 1 is a vertical section along the longitudinal center line of the press.

Fig. 2 is a side elevation of the press.

Figure 3:
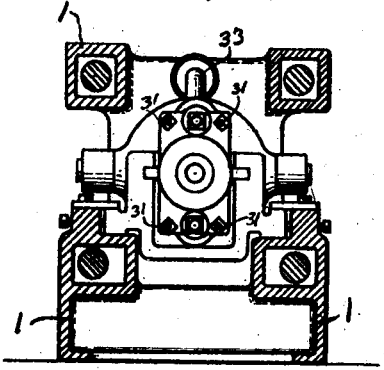
Fig. 3 is a transverse section taken on the line indicated at 3—3 in Fig. 1.
Figure 4:
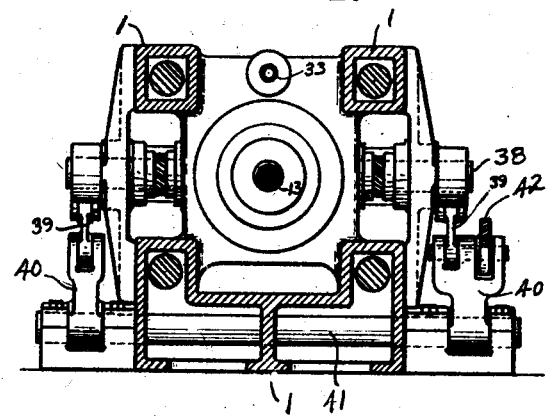
Fig. 4 is a transverse section taken on the line indicated at 4—4 in Fig. 2.
Figure 5:
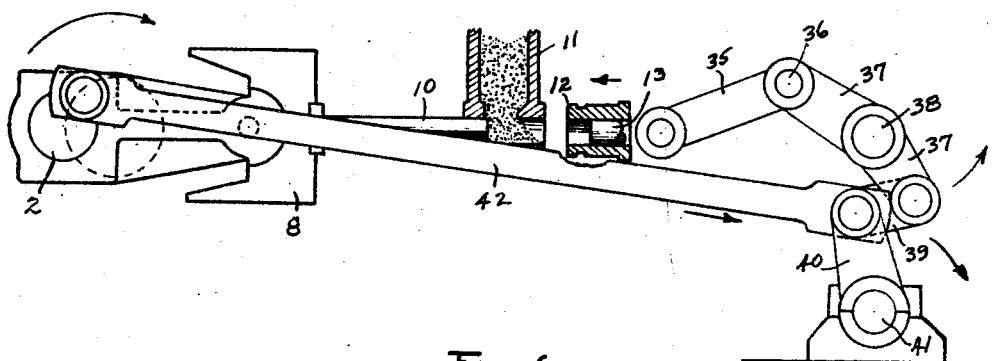
Fig. 5 is a diagrammatic view showing the position of the moving parts when the main plunger is in its retracted position.
Figure 6:
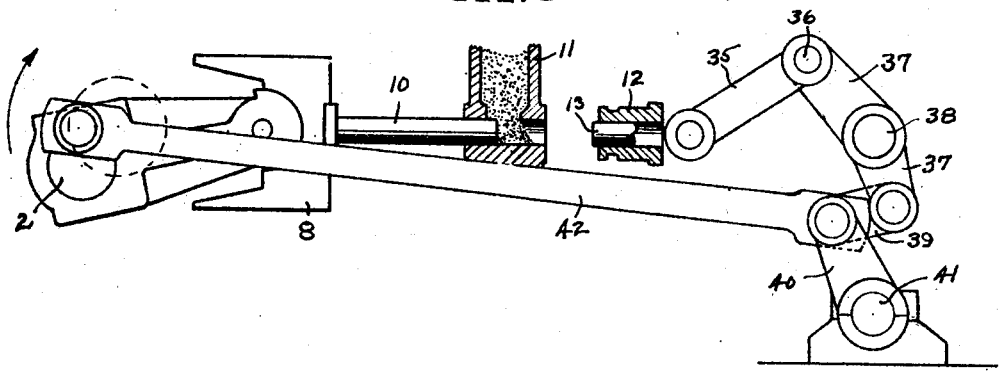
Fig. 6 is a diagrammatic view showing the position of the moving parts at the end of the mold stripping movement.

Referring to the accompanying drawings, the press is provided with a suitable supporting frame 1 and at one end of the frame there is mounted a transverse crank shaft 2 which is driven from a drive shaft 3 which has a gear 4 thereon meshing with a large gear 5 fixed to the crank shaft. Between the sides of the frame the shaft 2 has a crank arm 6 which actuates through a connecting pitman 7 a cross head 8 which is slidably mounted in guide members 9 forming a longitudinal guideway in the frame. Rigidly secured to the cross head 8 is a plunger 10 which is slidable through the bottom of a hopper 11 carried by the frame 1. The plunger 10 is the pressure applying plunger and moves from its retracted position across the bottom of the hopper 11 to force material from the hopper into a mold which will presently be described.

The mold comprises an open ended tubular casing 12 mounted in axial alignment with the plunger 10 together with a thrust receiving plunger 13 aligned with the plunger 10 and spaced from the hopper 11, the casing 12 being slidably mounted upon the plunger 13 and movable from a material receiving position against the hopper 11 to a mold stripping position in which the plunger 13 extends entirely through it, so that briquettes formed in the casing may be ejected therefrom.

The plunger 13 is fixed to a piston 14 which is mounted in a cylinder 15 fixed to the frame 1 and has on the side opposite that to which the plunger is attached a hollow stem 16 which extends through a bushing 16$^a$ in the head of the cylinder. The stem 16 has an axial bore 17 which forms a cylinder to receive a piston 18 which slides in a bushing 17$^a$ at the outer end of the bore 17 and is attached to a piston 19 in a large cylinder 20 at the end of the frame 1. A lateral opening 21 is provided in the stem 16 adjacent the inner end thereof by which communication is maintained between the interior of the cylinder 15 and the interior of the bore 17. The cylinder 15 communicates through a passage 22 with a chamber 23 alongside the same to which water is supplied at low pressure through a pipe 24 provided with a check valve 25 which permits flow of water to the chamber but prevents flow of water in the opposite direction.

A predetermined air pressure is maintained in the cylinder 20 which normally serves to hold the piston 19 against the inner head of the cylinder. The outer end of the stem 16 is threaded and has a nut 26 adjustable thereon which is adapted to engage the end of the cylinder 15 to limit the movement of the piston 14 toward the hopper 11, the position of the nut 26 determining the normal position of the thrust receiving piston 13. Water is supplied from a suitable source through the pipe 24 to fill the cylinders 15 and 17 and hold the nut 26 against the outer head of the cylinder 15. When material is compressed between the main plunger 10 and the plunger 13 the pressure is transmitted to the liquid in the cylinders 15 and 17 which is prevented from escaping and this pressure when it reaches a predetermined amount will be sufficient to move the piston 18 rearwardly in the cylinder 17 against the air pressure in the cylinder 20.

Since liquid is an incompressible medium the plunger 13 is held against movement until the predetermined pressure is exerted thereon whereupon the pressure of the liquid in the cylinder 17 becomes sufficient to move the piston 18 against the air pressure in the cylinder 20, and the plunger 13 is permitted to move at a rate proportional to the rate of movement of the piston 18, the pressure of the liquid and consequently the pressure exerted on the material in the mold remaining constant during the simultaneous movement of the two plungers in the same direction and during a portion of the return stroke while the plunger 13 is being returned by hydraulic pressure to its normal position. By means of the pneumatically controlled hydraulic cushion the briquettes are formed by the exertion of a predetermined pressure thereon as in a hydraulic press although the pressure applying piston is mechanically actuated, the mechanical actuation permitting a high speed of operation and the cushioning means protecting the actuating mechanism from excessive stresses due to the resistance to movement of the plunger offered by the material which is being compressed.

The mold casing 12 within which the briquettes are formed between plungers 10 and 13 is held against the hopper 11 during the initial portion of the pressure applying stroke of the plunger 10 so that the loose material which is to form the briquette is pushed from the hopper into the casing and, in order to uniformly compress the material into briquettes and to prevent injury to the operating mechanism the casing is so held that it will yield under a predetermined pressure and slide back on the plunger 13 so that the material within the casing between the plungers is squeezed in from both ends toward the center and compacted uniformly within the casing. The mechanism thus exerts on the briquette being formed a sustained pressure which permits the escape of gases and permits the particles to position themselves to form a uniform, compact and mechanically strong briquette. In case a binder as a bitumastic medium is used, the sustained pressure causes thorough intermingling of the binder with the material being briquetted. In addition the briquette is ejected from the casing during the return stroke of the plunger 10 by a positive actuation of the mold casing which causes it to slide back on the plunger 13 until the plunger projects entirely through the casing.

In forming briquettes of iron and steel turnings, small pieces of metal scrap and the like, a very high pressure is required and the pressure at which the casing 12 is permitted to yield must be correspondingly high. Under average conditions of operation this pressure is generally in a definite proportion to the pressure exerted by the ram. For example, for iron borings a pressure of 25 tons per square inch may be exerted by the main ram, and the pressure of the mold balance may be 1/6th of the total pressure exerted by the main ram.

One of the most important advantages of the present invention is that the operating connections for the mold casing are so designed that the thrust of the main plunger on the casing is largely transmitted to the supporting frame so that the operating connections are protected against injury and may be of comparatively light construction.

The casing 12 has rigidly secured thereto a plurality of pistons 27 arranged around the material receiving portion thereof and parallel with the plungers 10 and 13. The pistons 27 have a fluid tight fit in cylinders 28 carried by a cross head 29 slidable in longitudinal guides 30 in the frame 1 and the cross head 29 is connected to the casing 12 by tie rods 31 which permit movement of the casing toward the cross head but limit movement in the opposite directions so that the casing 12 may be positively moved with the cross head toward the plunger 13 to eject a briquette. The cylinders 28 are in communication with each other and communicate with the chamber 23 through a pipe 33 which is rigidly secured to the cross head 29 and slides in a bushing 34 in the end of the chamber 23. Since the cylinders 28 are in communication with the cylinders 15 and 17 through the chamber 22, the hydraulic pressure resisting movement of the casing will be proportional to the pressure resisting movement of the plunger 13, the ratio being determined by the relative areas of the piston surfaces exposed to the pressure of the liquid. It will be apparent upon inspection of the drawing that the pressure acting on the casing pistons in a small fraction of the pressure acting upon the piston carrying the thrust receiving plunger 13.

The cross head 29 is actuated by means of a pair of toggles one on each side of the frame and composed of links 35 pivoted at one end to the cross head and connected at their opposite ends by pivots 36 to levers 37 which turn on pivots 38 on the frame 1. The levers 37 extend beyond the pivots 38 and are connected by links 39 with arms 40 extending upwardly from a tranverse shaft 41 mounted in the base of the machine, the arms 40 are connected with connecting rod 42 which is driven from the crank shaft 2. The connecting rod 42 is offset in advance of the crank arm 6 preferably about forty-five degrees in order to move the casing 12 into engagement with the hopper 11 prior to the beginning of the pressure stroke of the plunger 10 and to properly time the ejection of the briquette.

The links 35, levers 37, links 39, arms 40 and connecting rods 42 are so proportioned and the fixed pivots 38 and 41 are so positioned that the toggle formed by the links 35 and levers 37 is straightened and the pivot 36 thereof brought to dead center position between the cross head 29 and pivot 38 by the pressure thrust of the crank arms 40 on the connecting rod 42 moving the casing 12 into engagement with the hopper 11 and holding the same while the material is being forced into the casing by the plunger 10, as shown in Fig. 2. The thrust of the plunger 10 on the casing 12 is transmitted through the liquid in the cylinders 28 to the cross head and through the links 35 and lever 37 forming the toggle to the pivots 38 on the frame. During the half revolution of the shaft 2 during which the connecting rod 42 is under compression the major portion of the pressure stroke of the plunger 10 is completed and the casing 12 will have been forced back on the cross head 29 which is rigidly held by the toggle. During the remainder of the revolution of the crank shaft the connecting rod 42 will be under tension and in its movement will open the toggle and move the cross head away from the hopper. As soon as the heads of the tie rods 31 are brought into engagement with the casing 12 the casing will be positively moved toward the plunger 13 to eject the briquette. By reason of the fact that the thrust of the plunger 10 on the casing is taken by the toggles, the connecting rod 42 is required during the time in which it is under compression to take only the thrust necessary to move the toggle to holding position. The connecting rod is required to exert a much greater force to positively move the casing to eject the briquettes but this movement is effected while the connecting rod is under tension. The connecting rod 42, by reason of this advantageous arrangement, may be comparatively light and the same is true of the levers and links through which the connecting rod actuates the cross head 29, since the lever 37 is a short lever and the short links 35 and 39 are under tension during the briquette ejecting movement.

In the operation of the machine the loose material to be briquetted is fed by suitable means into the hopper 11 and the crank shaft 2 is continuously driven to reciprocate the plunger 10 through the bottom of the hopper. At the beginning of the pressure stroke of the plunger 10 the casing 12 is held against the side of the hopper toward which the plunger 10 is moving and the material in the path of the plunger 10 is forced into the mold casing 12. As the material is compressed in the mold the friction of the material against the wall of the casing 12 increases transmitting more and more thrust to the casing, tending to move it away from the hopper. At the same time, the material is being pressed against the cushioned plunger 13, thus producing on the briquette being formed a sustained pressure, and the thrust on the casing and plunger builds up pressure in the communicating hydraulic cylinders until it is sufficient to move the piston 19 of the pressure regulating air cylinder 20 against the air pressure in said cylinder whereupon the plunger 13 and casing 14 are permitted to move in the same direction as the plunger 10 against predetermined movement resisting pressures. The movement of the mold casing 12 is determined by the friction of the material against the wall thereof and since the tendency is for the material immediately in front of the plunger 10 to pack first due to friction against the wall of the mold casing the initial thrust will be mainly on the mold casing and this thrust acting through the pistons 27 will build up pressure behind the hydraulic cylinders sufficient to operate the piston 19 and permit movement of the mold casing on the plunger 13 until the material is uniformly compacted whereupon the greater portion of the thrust will be directly against the plunger 13. This automatic relative movement of the mold casing and thrust receiving plunger due to the differential cushioning of the casing and plunger, enables the press to form briquettes of uniform density throughout.

At the end of the pressure stroke and dwell, and during the return stroke of the pressure applying piston 10 the mold casing 12 is positively moved by the connecting rod and toggle connections in a direction away from the hopper 11 and toward the plunger 13. In the meantime the hydraulic pressure acting upon the piston 14 forces the plunger to its normal position so that it projects through the mold casing at the end of the stroke of the mold casing to eject the briquette from the mold casing.

Adjustment of the plunger 13 with respect to the plunger 10 may be effected by adjustment of the nut 26 prior to admission of liquid to the cushioning cylinders. By adjusting the plunger 13 toward and from the plunger 10 the time during which the material is subjected to pressure may be increased or decreased as found advantageous for the particular material being handled.

It will be obvious that for lighter work suitable springs or other cushioning means may be substituted for the cushioning means, which for heavy pressures is preferably a cylinder containing a gaseous medium.

Furthermore, it is to be understood that the particular forms of apparatus shown and described, and the particular procedure set forth, are presented for purposes of explanation and illustration and that various modifications of said apparatus and procedure can be made without departing from our invention as defined in the appended claims.

What we claim is:

1. In a briquetting press, a supporting frame, an open ended tubular mold casing, a thrust receiving plunger extending into one end of the mold casing, a pressure applying plunger movable into and out of the opposite end of said mold casing, said mold casing and plungers being aligned axially and each mounted for axial movement in the frame, mechanical means for continuously reciprocating said pressure plunger with a stroke of predetermined length, actuating means operating in timed relation to the stroke of the pressure plunger to shift the mold casing from material receiving position in which it projects beyond the end of the thrust plunger to a position in which the thrust plunger extends through the casing to eject a molded briquette, and differential cushioning means for yieldably resisting movements of the mold casing and thrust plunger in the direction of the pressure stroke of the pressure plunger, said cushioning means permiting movement of the mold casing under an end thrust relatively light as compared to the end thrust required to move the thrust plunger, whereby the thrust plunger is advanced in the mold casing during compression of a briquette and the actuating means for the mold casing is protected against excessive stresses.

2. In a briquetting press, a supporting frame, an open ended tubular mold casing, a thrust receiving plunger extending into one end of the mold casing, a pressure applying plunger movable into and out of the opposite end of said mold casing, said mold casing and plunger being aligned axially and each mounted for axial movement in the frame, mechanical means for continuously reciprocating said pressure plunger with a stroke of predetermined length, actuating means operating in timed relation to the stroke of the pressure plunger to shift the mold casing from material receiving position in which it projects beyond the end of the thrust plunger to a position in which the thrust plunger extends through the casing to eject a molded briquette, cushioning means interposed between the thrust plunger and frame to yieldably resist movement of the thrust plunger in the direction of the pressure stroke to limit the stresses in the pressure plunger actuating mechanism during the pressure stroke, and cushioning means interposed between said mold casing and its actuating means to limit the stresses in said actuating means during the pressure stroke, the latter cushioning means permitting movement of the mold casing under an end thrust relatively light as compared to that required to move the thrust plunger.

3. In a briquetting press, a mold comprising a tubular casing and a thrust receiving plunger having a sliding fit in said casing, a pressure applying plunger opposed to said thrust receiving plunger, mechanical means for reciprocating said pressure applying plunger, means for applying pressure directly to said thrust receiving plunger, adjustable means for limiting the movement of the thrust receiving plunger toward the pressure applying plunger, and means for automatically limiting said hydraulic pressure to a predetermined maximum to limit the stresses in said mechanical plunger reciprocating means during the pressure stroke.

4. In a briquetting press, a mold comprising a tubular casing and a thrust receiving plunger having a sliding fit in said casing, a pressure applying plunger opposed to said thrust receiving plunger, mechanical means for reciprocating said pressure applying plunger, a crosshead movable longitudinally of said thrust receiving plunger, a hydraulic cushioning cylinder interposed between said crosshead and mold casing for limiting the thrust transmitted through said casing to the crosshead during the pressure stroke of the reciprocating plunger, a hydraulic cushioning cylinder for the thrust receiving plunger in communication with the first mentioned cylinder, and a pneumatic cylinder for limiting the pressure in said hydraulic cylinders.

5. In a briquetting press, a mechanically actuated pressure applying plunger, a mold comprising a tubular casing adapted to receive said plunger and a thrust receiving plunger in said casing, and hydraulic constant pressure cushioning means for exerting a predetermined pressure on said casing opposing movement thereof with the pressure applying plunger and for maintaining a predetermined pressure in excess of that on the mold casing on said thrust receiving plunger opposing movement thereof in the same direction.

6. A briquetting press comprising a frame, a hopper mounted in the frame, a plunger mounted for movement transversely through the hopper, a mold in axial alignment with said plunger and comprising a tubular casing and a thrust receiving plunger upon which said casing is slidable, mechanical means for reciprocating said first mentioned plunger, means for cushioning said thrust receiving plunger, a slidable crosshead for supporting said casing movable toward and from said hopper, cushioning means interposed between said crosshead and casing for limiting the thrust transmitted through said casing to the crosshead during the pressure stroke of the reciprocating plunger, and means for reciprocating said crosshead.

7. A briquetting press comprising a frame a hopper mounted in the frame, a plunger mounted for movement transversely through the hopper, a mold in axial alignment with said plunger and comprising a tubular casing and a thrust receiving plunger upon which said casing is slidable, mechanical means for reciprocating said first mentioned plunger, means for cushioning said thrust receiving plunger, a slidable crosshead for supporting said casing movable toward and from said hopper, cushioning means interposed between said crosshead and casing for limiting the thrust transmitted through said casing to the crosshead during the pressure stroke of the reciprocating plunger, a toggle interposed between the frame and crosshead for receiving the thrust of the first mentioned plunger on said casing, and means for actuating said toggle in timed relation to the movement of said mechanically actuated plunger to actuate the crosshead, said toggle and actuating means being so disposed that the toggle is disposed near its dead center position during the pressure stroke.

In testimony whereof we affix our signatures.

ALOIS K. NOWAK.
RICHARD W. DINZL.